US012110815B2

(12) United States Patent
Sugihara et al.

(10) Patent No.: US 12,110,815 B2
(45) Date of Patent: Oct. 8, 2024

(54) V-TYPE ENGINE AND WORK MACHINE

(71) Applicant: HONDA MOTOR CO., LTD., Tokyo (JP)

(72) Inventors: Atsuki Sugihara, Saitama (JP); Soji Kashima, Saitama (JP); Masanori Ishikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/549,533

(22) PCT Filed: Mar. 10, 2021

(86) PCT No.: PCT/JP2021/009506
§ 371 (c)(1),
(2) Date: Sep. 7, 2023

(87) PCT Pub. No.: WO2022/190253
PCT Pub. Date: Sep. 15, 2022

(65) Prior Publication Data
US 2024/0151176 A1  May 9, 2024

(51) Int. Cl.
*F01N 13/10* (2010.01)
*F01N 13/18* (2010.01)
*F02B 75/22* (2006.01)

(52) U.S. Cl.
CPC ........... *F01N 13/107* (2013.01); *F01N 13/10* (2013.01); *F01N 13/1805* (2013.01); *F02B 75/228* (2013.01)

(58) Field of Classification Search
CPC .... F01N 13/107; F01N 13/1805; F01N 1/006; F01N 13/10; F01N 3/28; F02M 25/0809;
(Continued)

(56) References Cited

U.S. PATENT DOCUMENTS 5,992,393 A     11/1999  Yoshida et al.
8,668,538 B1 *   3/2014  Langenfeld ............ B63H 21/34
                                                      440/89 H
(Continued)

FOREIGN PATENT DOCUMENTS

JP      S5195672 U    7/1976
JP      H08218935 A   8/1996
(Continued)

OTHER PUBLICATIONS

Written Opinion of the International Searching Authority for PCT Application PCT/JP2021/009506, mailed Jun. 1, 2021; 4 pp.

*Primary Examiner* — Syed O Hasan
(74) *Attorney, Agent, or Firm* — Armstrong Teasdale LLP

(57) ABSTRACT

A V-type engine includes an engine body including a crankcase configured to rotatably support a crankshaft, and a first and second cylinder banks extending from the crankcase, a first exhaust pipe connected to the first cylinder bank; a second exhaust pipe connected to the second cylinder bank; a merging pipe connected to the first and second exhaust pipes; a first catalyst accommodated in the first exhaust pipe; a second catalyst accommodated in the second exhaust pipe; and a muffler detachably connected to the merging pipe, wherein the first catalyst is arranged along an outer surface of the first cylinder bank, and the second catalyst is arranged along an outer surface of the second cylinder bank.

11 Claims, 6 Drawing Sheets

(58) Field of Classification Search
CPC .......... F02M 25/089; F02B 2075/1808; F02B 25/28; F02B 75/22; F02B 75/228; F02B 77/11
See application file for complete search history.

(56) References Cited

U.S. PATENT DOCUMENTS

| | | | |
|---|---|---|---|
| 8,690,625 | B2 | 4/2014 | Kato et al. |
| 9,120,549 | B2* | 9/2015 | Ochiai ................. F01N 13/004 |
| 11,156,138 | B2 | 10/2021 | Miyashita |
| 2010/0186381 | A1* | 7/2010 | Charles ................. F01N 3/025 |
| | | | 60/311 |
| 2019/0225313 | A1 | 7/2019 | Anderson et al. |
| 2020/0248602 | A1* | 8/2020 | Miyashita ............. F02B 61/045 |

FOREIGN PATENT DOCUMENTS

| | | | |
|---|---|---|---|
| JP | 2006226187 | A | 8/2006 |
| JP | 2008144681 | A | 6/2008 |
| JP | 2010285923 | A | 12/2010 |
| JP | 2011126392 | A | 6/2011 |
| JP | 2013124594 | A | 6/2013 |
| JP | 2020122440 | A | 8/2020 |
| WO | 2016002961 | A1 | 1/2016 |

* cited by examiner

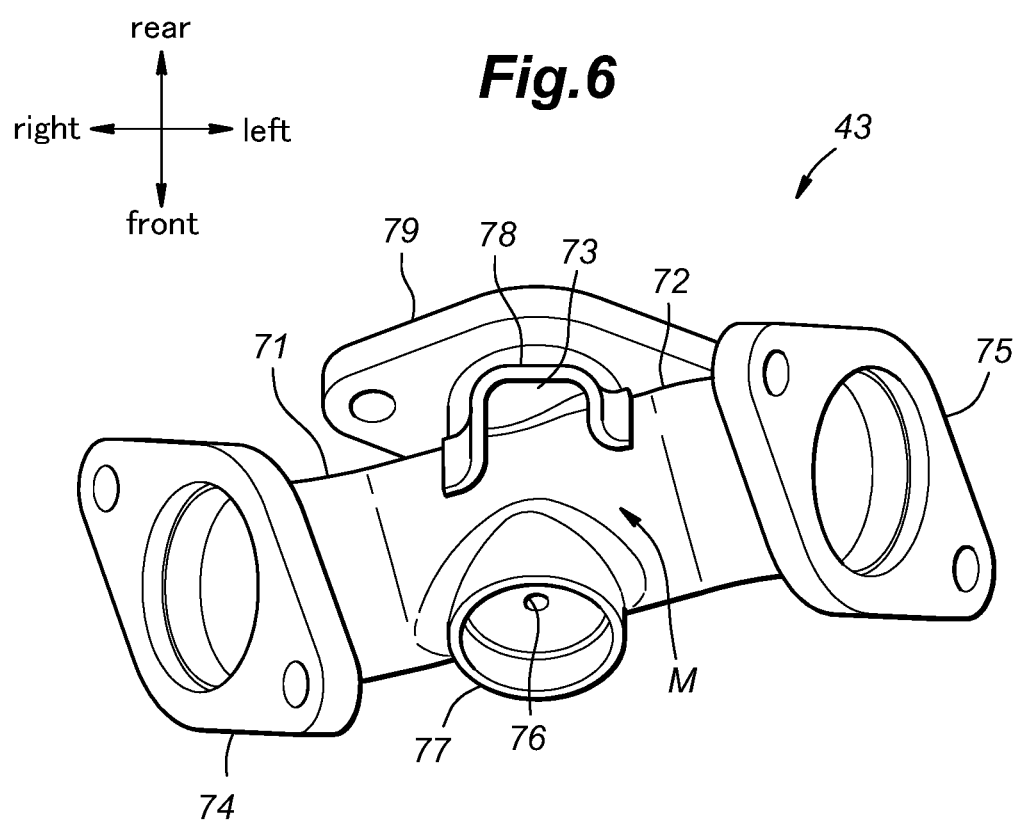

V-TYPE ENGINE AND WORK MACHINE

CROSS-REFERENCE TO RELATED APPLICATION

This application is a U.S. national stage application of PCT/JP2021/009506, filed on Mar. 10, 2021, which is hereby expressly incorporated by reference in its entirety.

TECHNICAL FIELD

The present invention relates to a V-type engine and a work machine.

BACKGROUND ART

Conventionally, an engine is provided with an exhaust device for discharging an exhaust gas generated in a combustion process. The exhaust device includes an exhaust pipe through which the exhaust gas passes, a catalyst configured to purify the exhaust gas, a muffler configured to reduce an exhaust sound, and the like. For example, the exhaust gas generated in the combustion process passes through the exhaust pipe, the catalyst, and the muffler in this order, and is discharged outside the engine.

For example, Patent Document 1 discloses an exhaust purifying device for a V-type engine. The exhaust purifying device includes a front exhaust passage connected to a front bank, a rear exhaust passage connected to a rear bank, a primary exhaust passage connected to the front exhaust passage and the rear exhaust passage, a catalytic converter provided in the primary exhaust passage, and a catalyst provided in the catalytic converter.

PRIOR ART DOCUMENT(S)

Patent Document(s)

Patent Document 1: JP2006-226187A

SUMMARY OF THE INVENTION

Task to be Accomplished by the Invention

However, in Patent Document 1, the catalytic converter is away from the front bank and the rear bank. Accordingly, the V-type engine including the exhaust purifying device becomes larger. Further, in the exhaust purifying device as described above, a muffler may be fixed to the primary exhaust passage by welding or the like. However, adopting such a configuration reduces the flexibility for setting the muffler.

In view of the above background, an object of the present invention is to improve the flexibility for setting a muffler and make a V-type engine compact.

Means to Accomplish the Task

To achieve such an object, one aspect of the present invention provides a V-type engine (1), comprising: an engine body (3) including a crankcase (7) configured to rotatably support a crankshaft (11), and a first and second cylinder banks (8, 9) extending from the crankcase; a first exhaust pipe (41) connected to the first cylinder bank; a second exhaust pipe (42) connected to the second cylinder bank; a merging pipe (43) connected to the first and second exhaust pipes; a first catalyst (32a) accommodated in the first exhaust pipe; a second catalyst (32b) accommodated in the second exhaust pipe; and a muffler (33) detachably connected to the merging pipe, wherein the first catalyst is arranged along an outer surface (8c) of the first cylinder bank, and the second catalyst is arranged along an outer surface (9c) of the second cylinder bank.

According to this aspect, the muffler is detachably connected to the merging pipe, so that the user can set an appropriate muffler according to the configuration and the like of a work machine in which the V-type engine is installed. Accordingly, the flexibility for setting the muffler can be improved.

Further, the first and second catalysts are arranged along the outer surface of the first and second cylinder banks. Accordingly, the engine body and the first and second catalysts are arranged compactly, so that the V-type engine can be made compact.

In the above aspect, preferably, provided that an axial direction of the crankshaft is defined as a first direction, the first catalyst is arranged along a surface (8c) of the first cylinder bank on one side in the first direction, and the second catalyst is arranged along a surface (9c) of the second cylinder bank on the one side in the first direction.

According to this aspect, it is possible to prevent the first and second catalysts from protruding outside the engine body. Accordingly, the engine body and the first and second catalysts are arranged more compactly, so that the V-type engine can be made even more compact.

In the above aspect, preferably, provided that a width direction of the engine body is defined as a second direction, an exhaust port (19) is provided on an outside surface (8b, 9b) of the first and second cylinder banks in the second direction, and the first and second exhaust pipes include: an upstream portion (51, 61) connected to the exhaust port and arranged along the outside surface of the first and second cylinder banks in the second direction; and a downstream portion (52, 62) connected to the upstream portion and arranged along the surface of the first and second cylinder banks on the one side in the first direction, and the first catalyst is accommodated in the downstream portion of the first exhaust pipe, and the second catalyst is accommodated in the downstream portion of the second exhaust pipe.

According to this aspect, the engine body and the first and second exhaust pipes are arranged compactly, so that the V-type engine can be made even more compact.

In the above aspect, preferably, the upstream portion of the first and second exhaust pipes is formed of a pipe having a divided structure.

According to this aspect, the flexibility of the shape of the upstream portion of the first and second exhaust pipes is improved, so that the volume of the upstream portion of the first and second exhaust pipes can be increased. Accordingly, the expansion of the exhaust gas in the first and second exhaust pipes is promoted, so that the temperature of the exhaust gas can be adjusted to the optimum temperature for the catalysts.

In the above aspect, preferably, the downstream portion of the first and second exhaust pipes is formed of a pipe having an undivided structure.

According to this aspect, the manufacturing cost of an exhaust collecting pipe can be kept low as compared with a case where the entire first and second exhaust pipes are formed of a pipe having a divided structure.

In the above aspect, preferably, an output portion (12) of the crankshaft protrudes from a surface (7a) of the crankcase on the one side in the first direction, and the first and second catalysts are arranged closer to another side in the first direction than the surface of the crankcase on the one side in the first direction.

According to this aspect, it is possible to prevent the first and second catalysts from protruding to the one side in the first direction of the engine body. Accordingly, the engine body and the first and second catalysts are arranged more compactly, so that the V-type engine can be made even more compact.

In the above aspect, preferably, the merging pipe integrally includes: a first pipe (71) detachably connected to the first exhaust pipe; a second pipe (72) detachably connected to the second exhaust pipe; and a third pipe (73) connected to a merging portion (M) of the first and second pipes, and the muffler is detachably connected to the third pipe.

According to this aspect, the merging pipe can be detached from the first and second exhaust pipes, so that an appropriate merging pipe can be selectively used according to the shape and arrangement of the muffler. Accordingly, the flexibility of setting of the muffler can be further improved.

In the above aspect, preferably, the muffler is arranged higher than the first and second pipes, and a drain hole (76) is provided on a bottom surface of the merging portion of the first and second pipes.

According to this aspect, it is possible to prevent the drops of water falling from the muffler from collecting in the merging portion of the first and second pipes, so that the merging pipe is less likely to corrode.

In the above aspect, preferably, when viewed in an axial direction of the crankshaft, the merging pipe is arranged between the first and second cylinder banks.

According to this aspect, the engine body and the merging pipe are arranged compactly, so that the V-type engine can be made even more compact.

In the above aspect, preferably, wherein the muffler includes a muffler body (81) having a muffling chamber (86), and the muffler body extends in a width direction of the engine body from a distal end side of the first cylinder bank to a distal end side of the second cylinder bank.

According to this aspect, it is possible to sufficiently secure the length of the muffler body without protruding the muffler body greatly with respect to the engine body. Accordingly, the volume of the muffler body is increased, so that the muffling performance can be enhanced.

In the above aspect, preferably, the V-type engine further comprises an air cleaner (4) connected to the first and second cylinder banks, wherein the air cleaner is arranged on an opposite side of the first and second catalysts with the first and second cylinder banks in between.

According to this aspect, the air cleaner is arranged sufficiently away from the first and second catalysts, and the first and second cylinder banks are arranged between the first and second catalysts and the air cleaner. Accordingly, it is possible to prevent the temperature around the air cleaner from rising due to the heat generation of the first and second catalysts. Accordingly, the intake air temperature of the V-type engine can be lowered, so that the output of the V-type engine can be improved.

To achieve such an object, another aspect of the present invention provides a work machine (P) comprising the V-type engine.

According to this aspect, it is possible to improve the flexibility for setting a muffler and make a work machine compact.

Effect of the Invention

Thus, according to the above aspects, it is possible to improve the flexibility for setting a muffler and make a V-type engine compact.

BRIEF DESCRIPTION OF THE DRAWING(S)

FIG. 6 is a perspective view showing a merging pipe according to the embodiment of the present invention.

MODE(S) FOR CARRYING OUT THE INVENTION

<V-Type Engine 1>

Figure 1:
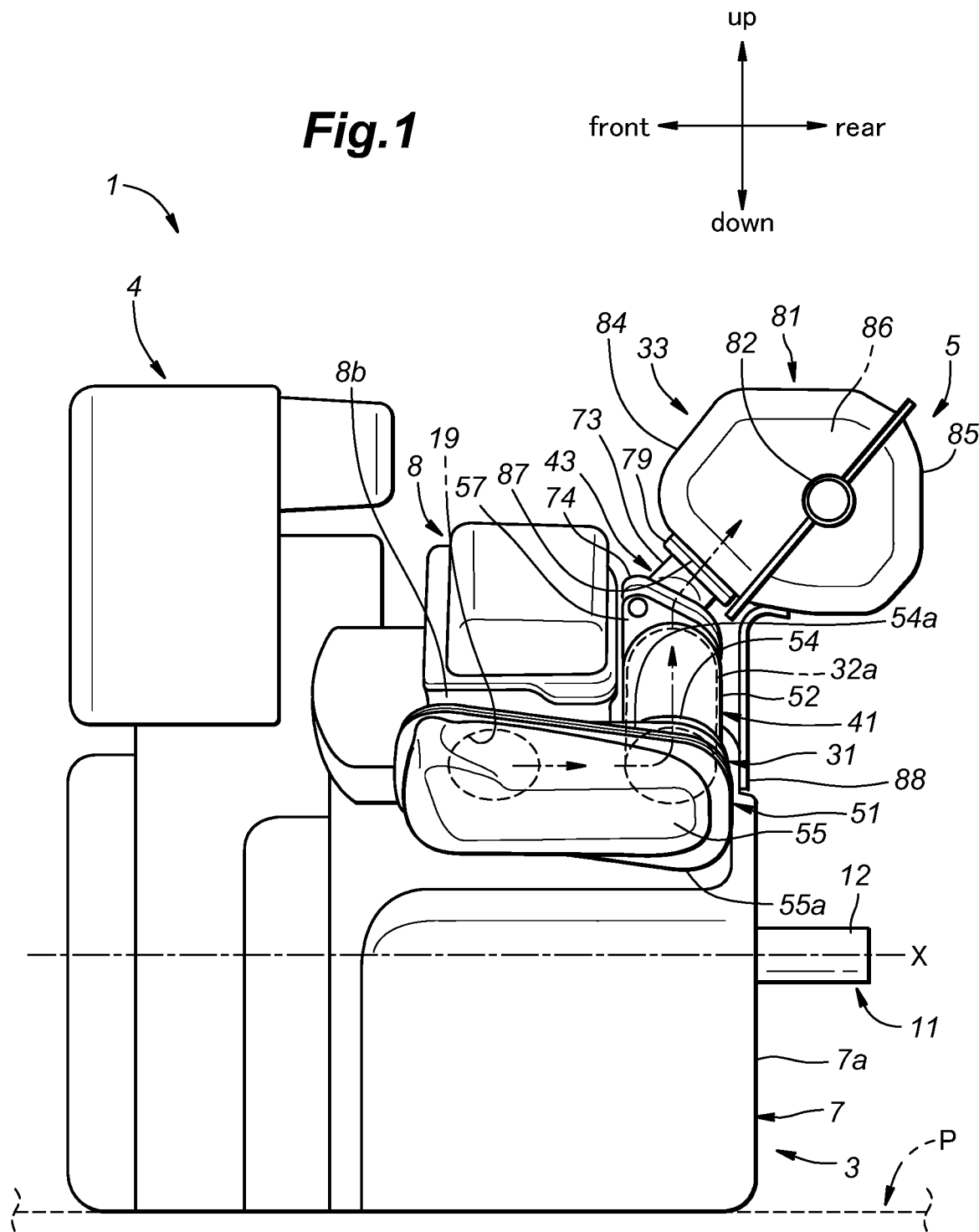
FIG. 1 is a right side view showing a V-type engine according to an embodiment of the present invention.

In the following, a V-type engine 1 (hereinafter abbreviated as "engine 1") as an internal combustion engine according to an embodiment of the present invention will be described with reference to FIGS. 1 to 6. Hereinafter, for convenience of explanation, a left side in FIG. 1 is defined as a front side of the engine 1. Further, the front-and-rear direction, the lateral direction, and the up-and-down direction are defined as the first direction, the second direction, and the third direction, respectively. Further, in this specification, when an expression like "fixed by bolt(s) (not shown)" is used, a member may be fixed by normal bolt(s) having a screw on only one side or by stud bolt(s) having screws on both sides.

Figure 2:
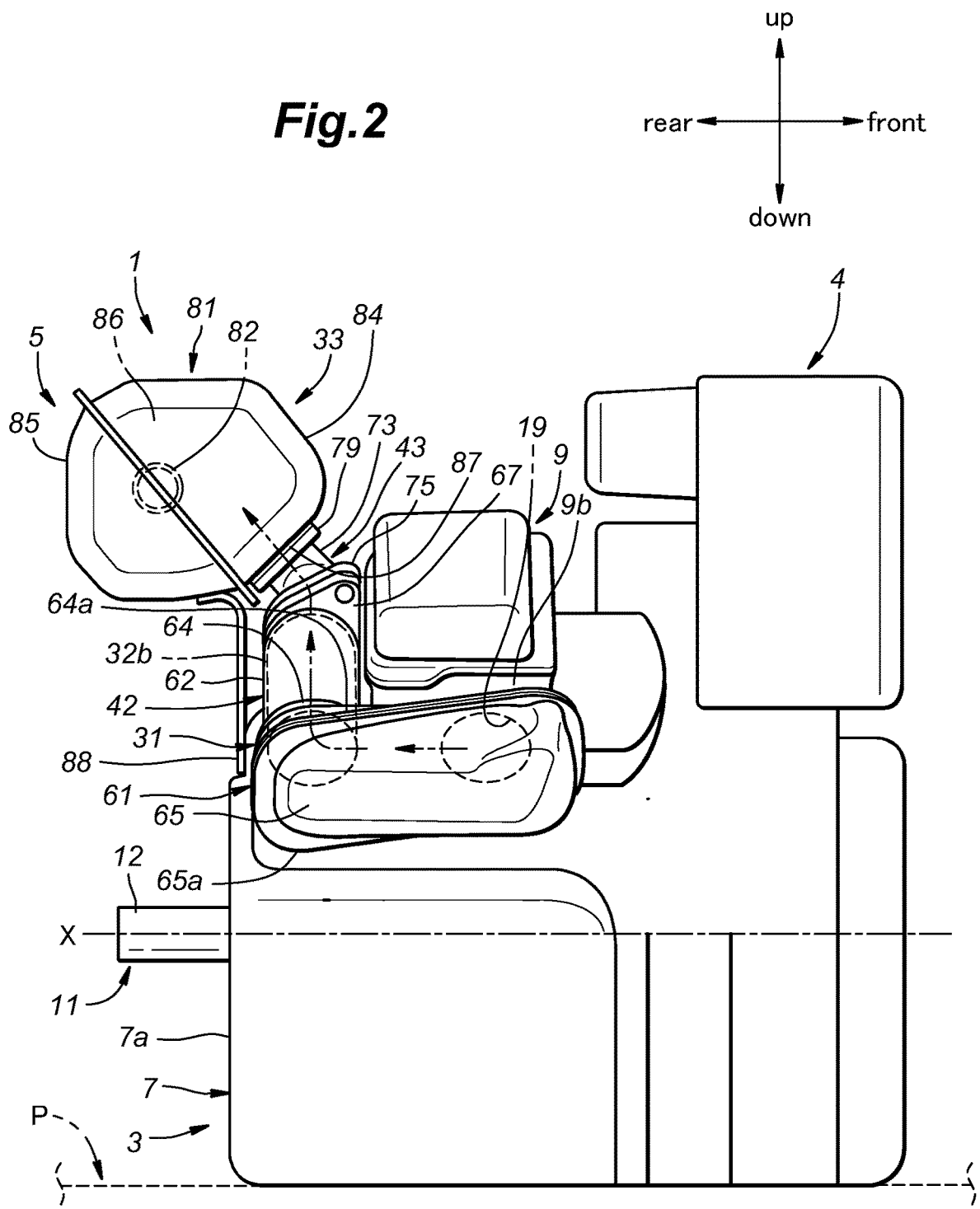
FIG. 2 is a left side view showing the V-type engine according to the embodiment of the present invention.

With reference to FIGS. 1 and 2, the engine 1 consists of a general-purpose engine used as a power source of a work machine P. For example, the work machine P consists of a cutting machine such as a concrete cutter, a floor treatment machine such as a floor leveler, a high-pressure washer, a generator, or the like. The engine 1 consists of an OHV air-cooled engine including two cylinders. In another embodiment, the engine 1 may consist of an engine (for example, an OHC engine) other than an OHV engine, an engine (for example, a water-cooled engine) other than an air-cooled engine, or an engine including three or more cylinders.

Figure 3:
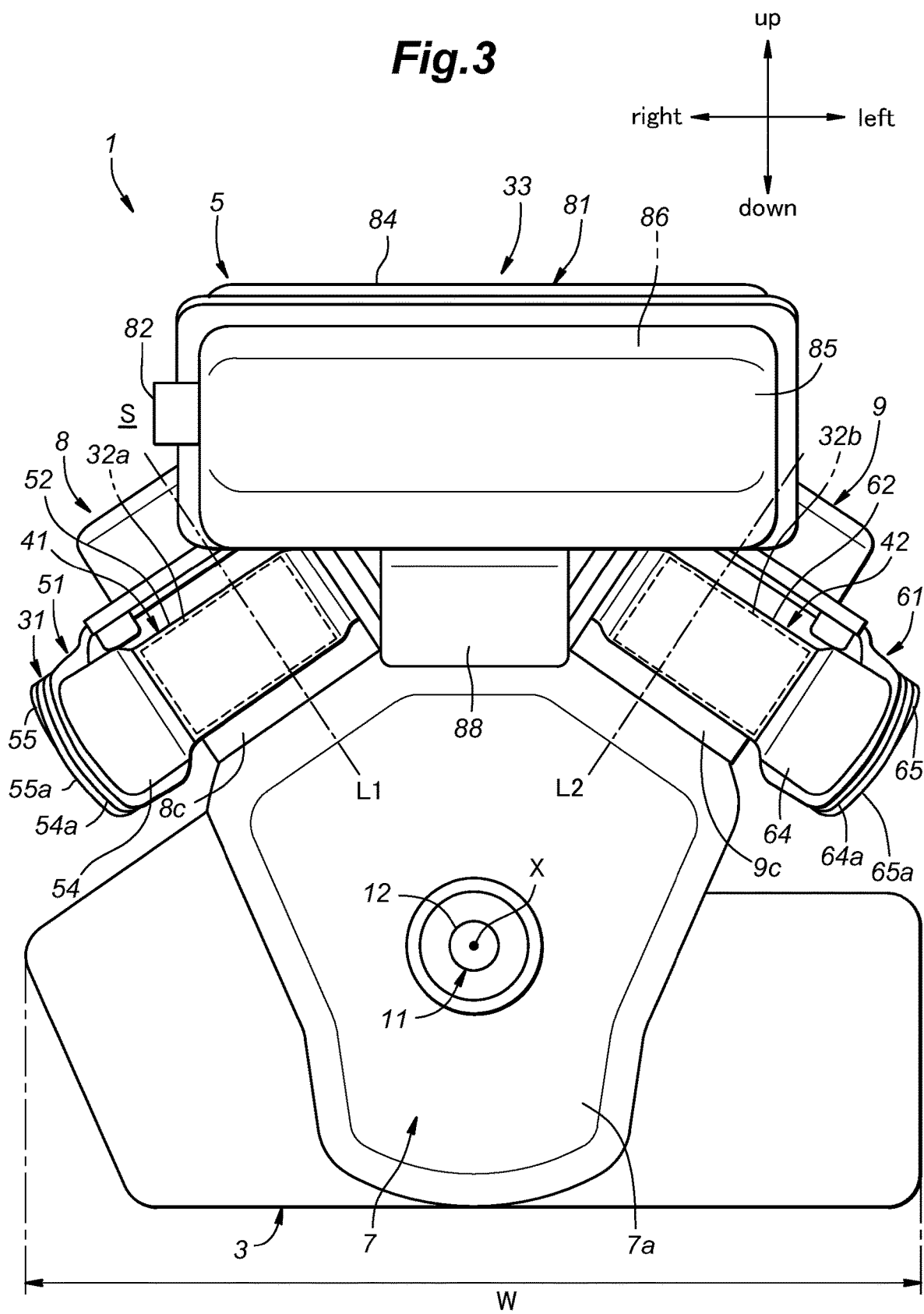
FIG. 3 is a rear view showing the V-type engine according to the embodiment of the present invention.

With reference to FIGS. 1 to 3, the engine 1 includes an engine body 3, an air cleaner 4 arranged on a front upper side of the engine body 3, and an exhaust device 5 arranged on an upper rear side of the engine body 3. In the following, these components of the engine 1 will be described in order.

<Engine Body 3>

Figure 4:
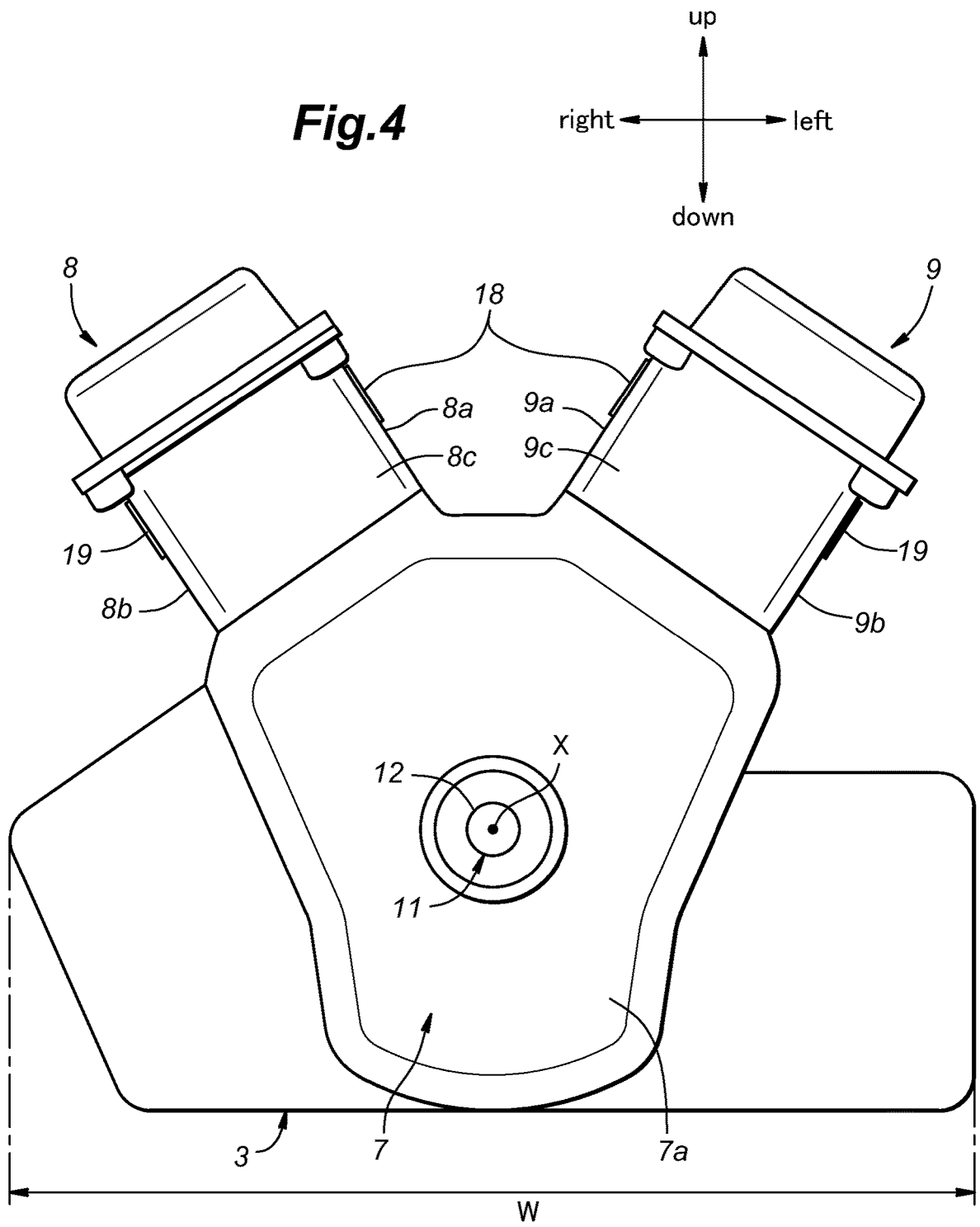
FIG. 4 is a rear view showing an engine body according to the embodiment of the present invention.

With reference to FIG. 4, the engine body 3 includes a crankcase 7, a first cylinder bank 8 extending to an upper right side from the crankcase 7, and a second cylinder bank 9 extending to an upper left side from the crankcase 7.

With reference to FIGS. 1 to 3, a crankshaft 11 is rotatably supported by a central portion of the crankcase 7. The crankshaft 11 is configured to rotate around a rotation axis X extending in the front-and-rear direction. That is, the engine 1 consists of a horizontal engine in which the rotation axis X of the crankshaft 11 extends in the horizontal direction. In another embodiment, the engine 1 may consist of a vertical engine in which the rotation axis X of the crankshaft 11 extends in the up-and-down direction. In such a case, for example, the work machine P is a riding-type lawn mower. A power take-off shaft 12 (PTO shaft: an example of an output portion) is provided at a rear end of the crankshaft 11. The PTO shaft 12 is connected to a work unit of the work machine P (for example, a blade of the concrete cutter), and the work unit of the work machine P is configured to rotate according to the rotation of the PTO shaft 12. The PTO shaft 12 protrudes rearward from a rear surface 7a of the crankcase 7 and extends in the front-and-rear direction.

With reference to FIG. 4, the first and second cylinder banks 8, 9 are aligned in the lateral direction (the width direction of the engine body 3). Each of the first and second cylinder banks 8, 9, is provided diagonally above the crankcase 7.

In a lower portion (cylinder) of each of the first and second cylinder banks 8, 9, a piston (not shown) is accommodated so as to reciprocate. The piston is connected to the crankshaft 11 via a connecting rod (not shown). An upper portion (cylinder head) of each of the first and second cylinder banks 8, 9 defines a combustion chamber (not shown) together with the piston.

An intake port 18 communicating with the combustion chamber opens on an inside surface 8a, 9a of each of the first and second cylinder banks 8, 9 in the lateral direction (a left surface 8a of the first cylinder bank 8, and a right surface 9a of the second cylinder bank 9). An exhaust port 19 communicating with the combustion chamber opens on an outside surface 8b, 9b of each of the first and second cylinder banks 8, 9 in the lateral direction (a right surface 8b of the first cylinder bank 8, and a left surface 9b of the second cylinder bank 9).

<Air Cleaner 4>

With reference to FIGS. 1 and 2, the air cleaner 4 is arranged more forward than the first and second cylinder banks 8, 9. The air cleaner 4 is connected to the intake port 18 of each of the first and second cylinder banks 8, 9 via an intake collecting pipe (not shown), and the air cleaned by the air cleaner 4 is introduced into the combustion chamber (not shown) via the intake port 18.

<Exhaust Device 5>

The exhaust device 5 is a device configured to discharge the exhaust gas discharged from the engine body 3 to an outside of the engine 1. Hereinafter, an expression "upstream" and an expression "downstream" indicate "upstream" and "downstream" in an exhaust direction (namely, a direction in which the exhaust gas flows inside the exhaust device 5), respectively. One-dot chain line arrows appropriately attached to each figure indicate the exhaust direction. Hereinafter, the description "extends in the lateral direction from the upper end side (distal end side) of the first cylinder bank 8 to the upper end side (distal end side) of the second cylinder bank 9" means that a component of the exhaust device 5 extends in the lateral direction at least from the upper end side (distal end side) of the first cylinder bank 8 to the upper end side (distal end side) of the second cylinder bank 9, and does not preclude the above-mentioned component from having a length longer than the above-mentioned layout.

With reference to FIGS. 1 to 3, the exhaust device 5 includes an exhaust collecting pipe 31, first and second catalysts 32a, 32b, and a muffler 33. Hereinafter, the components of the exhaust device 5 will be described in order.

<Exhaust Collecting Pipe 31>

Figure 5:
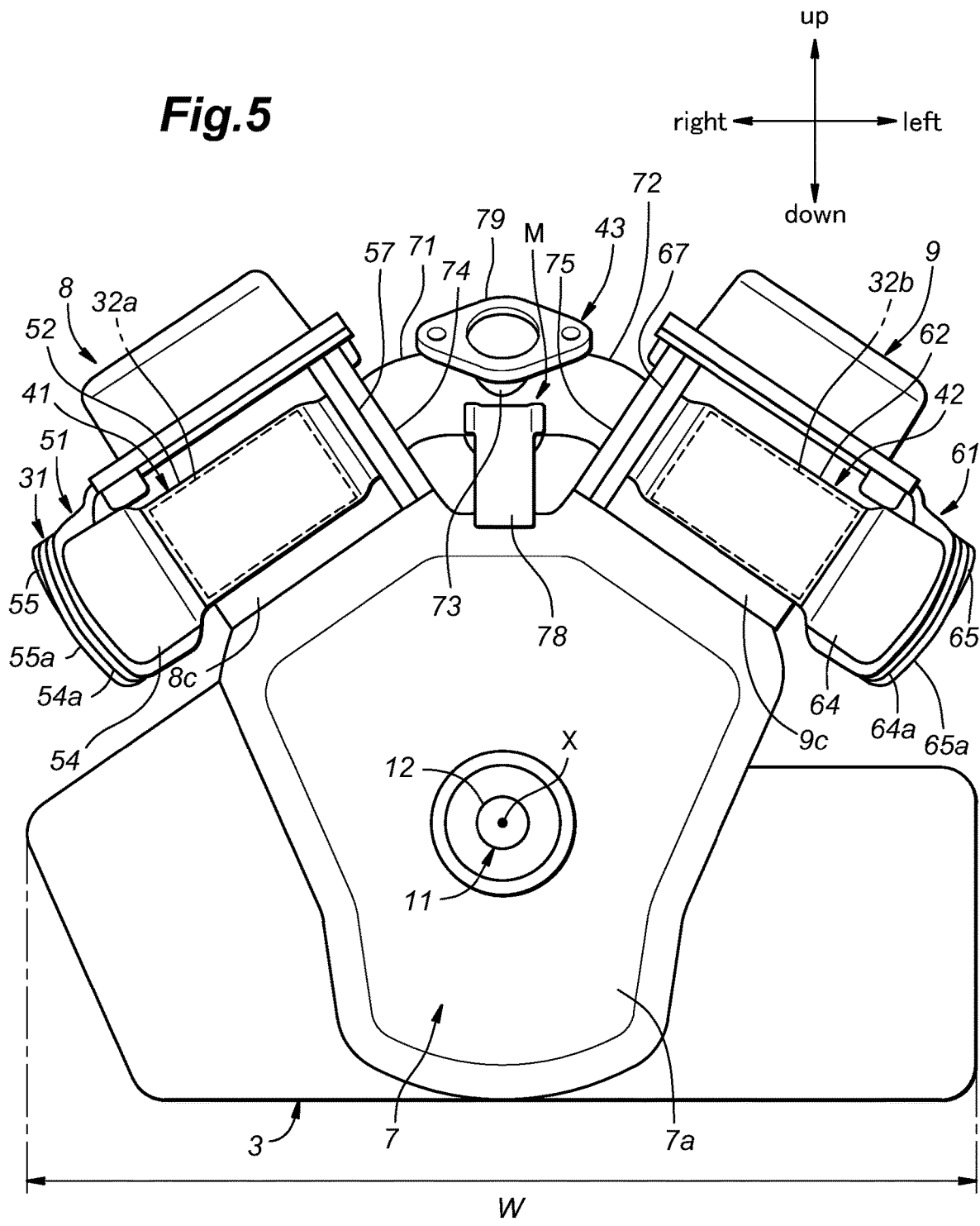
FIG. 5 is a rear view showing the engine body, an exhaust collecting pipe, and first and second catalysts according to the embodiment of the present invention.

With reference to FIGS. 1 and 2, the exhaust collecting pipe 31 of the exhaust device 5 is arranged closer to a front side (the other side in the front-and-rear direction) than the rear surface 7a (a surface on one side in the front-and-rear direction) of the crankcase 7. The exhaust collecting pipe 31 is arranged within a width W of the engine body 3 when viewed in the front-and-rear direction (the axial direction of the crankshaft 11). With reference to FIG. 5, the exhaust collecting pipe 31 includes a first exhaust pipe 41, a second exhaust pipe 42, and a merging pipe 43.

With reference to FIGS. 1 and 5, the first exhaust pipe 41 of the exhaust collecting pipe 31 includes an upstream portion 51 and a downstream portion 52.

The upstream portion 51 of the first exhaust pipe 41 includes an inside portion 54, and an outside portion 55 arranged on a right side (an outside in the lateral direction) of the inside portion 54. An inside flange 54a is provided on an outer circumference of the inside portion 54, and an outside flange 55a is provided on an outer circumference of the outside portion 55. The inside flange 54a and the outside flange 55a are welded together over the entire circumference thereof, and thereby the inside portion 54 and the outside portion 55 are integrated with each other. The upstream portion 51 is formed of a pipe having a divided structure (divided hollow structure) so as to define a chamber.

The upstream portion 51 of the first exhaust pipe 41 extends in the front-and-rear direction (the axial direction of the crankshaft 11). A front portion of the upstream portion 51 is arranged along the right surface 8b of the first cylinder bank 8. The front portion of the upstream portion 51 is fixed around the exhaust port 19 of the first cylinder bank 8 by a pair of bolts (not shown). Thus, the front portion of the upstream portion 51 is connected to the exhaust port 19 of the first cylinder bank 8. A rear portion of the upstream portion 51 protrudes more rearward than the first cylinder bank 8.

The downstream portion 52 of the first exhaust pipe 41 is formed of a pipe having an undivided structure. The downstream portion 52 is arranged along a rear surface 8c (an outer surface, and a surface on one side in the front-and-rear direction) of the first cylinder bank 8. The downstream portion 52 inclines upward as extending to a left side (an inside in the lateral direction). A right end (an outside end in the lateral direction) of the downstream portion 52 is connected to the rear portion of the upstream portion 51. A first connecting flange 57 is provided at a left end (an inside end in the lateral direction) of the downstream portion 52.

With reference to FIGS. 2 and 5, the second exhaust pipe 42 of the exhaust collecting pipe 31 includes an upstream portion 61 and a downstream portion 62.

The upstream portion 61 of the second exhaust pipe 42 includes an inside portion 64, and an outside portion 65 arranged on a left side (an outside in the lateral direction) of the inside portion 64. An inside flange 64a is provided on an outer circumference of the inside portion 64, and an outside flange 65a is provided on an outer circumference of the outside portion 65. The inside flange 64a and the outside flange 65a are welded together over the entire circumference thereof, and thereby the inside portion 64 and the outside portion 65 are integrated with each other. The upstream portion 61 is formed of a pipe having a divided structure (divided hollow structure) so as to define a chamber.

The upstream portion 61 of the second exhaust pipe 42 extends in the front-and-rear direction (the axial direction of the crankshaft 11). A front portion of the upstream portion 61 is arranged along the left surface 9b of the second cylinder bank 9. The front portion of the upstream portion 61 is fixed around the exhaust port 19 of the second cylinder bank 9 by a pair of bolts (not shown). Thus, the front portion of the upstream portion 61 is connected to the exhaust port 19 of the second cylinder bank 9. A rear portion of the upstream portion 61 protrudes more rearward than the second cylinder bank 9.

The downstream portion 62 of the second exhaust pipe 42 is formed of a pipe having an undivided structure. The downstream portion 62 is arranged along a rear surface 9c (an outer surface, and a surface on one side in the front-and-rear direction) of the second cylinder bank 9. The downstream portion 62 inclines upward as extending to a right side (an inside in the lateral direction). A left end (an outside end in the lateral direction) of the downstream portion 62 is connected to the rear portion of the upstream portion 61. A second connecting flange 67 is provided at a right end (an inside end in the lateral direction) of the downstream portion 62.

With reference to FIG. 5, the merging pipe 43 of the exhaust collecting pipe 31 is arranged at the center in the lateral direction of the engine body 3. The merging pipe 43 is arranged between the first and second cylinder banks 8, 9 when viewed in the front-and-rear direction. The merging pipe 43 integrally includes a first pipe 71, a second pipe 72, and a third pipe 73.

With reference to FIGS. 5 and 6, the first pipe 71 of the merging pipe 43 curves so as to protrude upward, and extends in the lateral direction. A first fixed flange 74 is provided at a right end (an outside end in the lateral direction) of the first pipe 71. The first fixed flange 74 is fixed to the first connecting flange 57 of the downstream portion 52 of the first exhaust pipe 41 by a pair of bolts (not shown). Thus, the right end of the first pipe 71 is detachably connected to the left end of the downstream portion 52 of the first exhaust pipe 41.

The second pipe 72 of the merging pipe 43 curves so as to protrude upward, and extends in the lateral direction. A second fixed flange 75 is provided at a left end (an outside end in the lateral direction) of the second pipe 72. The second fixed flange 75 is fixed to the second connecting flange 67 of the downstream portion 62 of the second exhaust pipe 42 by a pair of bolts (not shown). Thus, the left end of the second pipe 72 is detachably connected to the right end of the downstream portion 62 of the second exhaust pipe 42.

A left end (an inside end in the lateral direction) of the first pipe 71 of the merging pipe 43 and a right end (an inside end in the lateral direction) of the second pipe 72 of the merging pipe 43 merge at a merging portion M arranged in the center in the lateral direction of the engine body 3. A drain hole 76 is arranged at the center on a bottom surface of the merging portion M. A cylindrical boss 77 protrudes downward around the drain hole 76 on the bottom surface of the merging portion M. A rear surface of the merging portion M is supported by an upper portion of the crankcase 7 via a stay 78 extending in the up-and-down direction.

With reference to FIGS. 1, 2, and 6, the third pipe 73 of the merging pipe 43 inclines with respect to the up-and-down direction. In another embodiment, the third pipe 73 may be parallel to the up-and-down direction. A lower end of the third pipe 73 is connected to the merging portion M of the first and second pipes 71, 72. A third fixed flange 79 is provided at an upper end of the third pipe 73.

<First and Second Catalysts 32a, 32b>

With reference to FIGS. 1 to 3, the first and second catalysts 32a, 32b of the exhaust device 5 have a cylindrical shape. The first and second catalysts 32a, 32b consist of a ternary catalyst, for example. The first and second catalysts 32a, 32b are configured to purify the exhaust gas by changing a harmful substance in the exhaust gas, which is discharged from the engine body 3 via the exhaust collecting pipe 31, into a harmless substance by a chemical reaction.

With reference to FIGS. 1 and 2, the first and second catalysts 32a, 32b are arranged lower than upper ends of the first and second cylinder banks 8, 9, and arranged higher than a lower end of the crankcase 7. That is, the first and second catalysts 32a, 32b are arranged within the height of the engine body 3 when viewed in the lateral direction. The first and second catalysts 32a, 32b are arranged more forward than a rear end of the crankcase 7, and arranged more rearward than a front end of the crankcase 7. That is, the first and second catalysts 32a, 32b are arranged within the thickness of the engine body 3 when viewed in the lateral direction. More specifically, the first and second catalysts 32a, 32b are arranged closer to a front side (the other side in the front-and-rear direction) than the rear surface 7a (the surface on one side in the front-and-rear direction) of the crankcase 7.

With reference to FIG. 3, the first and second catalysts 32a, 32b are arranged more leftward than a right end of the engine body 3, and arranged more rightward than a left end of the engine body 3. That is, the first and second catalysts 32a, 32b are arranged within the width W of the engine body 3 when viewed in the front-and-rear direction.

With reference to FIGS. 1 and 3, the first catalyst 32a extends in a direction perpendicular to both the axial direction L1 of the first cylinder bank 8 and the front-and-rear direction. The first catalyst 32a is arranged along the rear surface 8c (the outer surface, and the surface on one side in the front-and-rear direction) of the first cylinder bank 8. The first catalyst 32a is accommodated in the downstream portion 52 of the first exhaust pipe 41. The first catalyst 32a is arranged on an opposite side of the air cleaner 4 with the first cylinder bank 8 in between.

With reference to FIGS. 2 and 3, the second catalyst 32b extends in a direction perpendicular to both the axial direction L2 of the second cylinder bank 9 and the front-and-rear direction. The second catalyst 32b is arranged along the rear surface 9c (the outer surface, and the surface on one side in the front-and-rear direction) of the second cylinder bank 9. The second catalyst 32b is accommodated in the downstream portion 62 of the second exhaust pipe 42. The second catalyst 32b is arranged on an opposite side of the air cleaner 4 with the second cylinder bank 9 in between.

<Muffler 33>

With reference to FIGS. 1 and 2, when viewed in the lateral direction, the muffler 33 of the exhaust device 5 is arranged on an opposite side of the air cleaner 4 with the first and second cylinder banks 8, 9 in between. The muffler 33 is arranged on a downstream side of the exhaust collecting pipe 31. The muffler 33 is arranged higher than the first and second pipes 71, 72 of the exhaust collecting pipe 31. The muffler 33 includes a muffler body 81 and a discharge pipe 82.

With reference to FIGS. 1 and 2, the muffler body 81 of the muffler 33 protrudes more rearward than the rear surface 7a of the crankcase 7. As shown in FIG. 3, the muffler body 81 extends in the lateral direction from the upper end side (distal end side) of the first cylinder bank 8 to the upper end side (distal end side) of the second cylinder bank 9. When viewed in the front-and-rear direction, left and right side portions of the muffler body 81 overlap with upper portions of the first and second cylinder banks 8, 9. The muffler body 81 is arranged within the width W of the engine body 3 when viewed in the front-and-rear direction.

The muffler body 81 has a shape elongated in the lateral direction. That is, in the present embodiment, the longitudinal direction of the muffler body 81 is the lateral direction. The muffler body 81 includes a front portion 84 and a rear portion 85. An outer circumferential portion of the front portion 84 and an outer circumferential portion of the rear portion 85 are fixed with each other, thereby the front portion 84 and the rear portion 85 are integrated with each other. A muffling chamber 86 is formed inside the muffler body 81.

With reference to FIGS. 1 and 2, a connecting flange 87 is provided at a lower front portion of the muffler body 81. The connecting flange 87 is fixed to the third fixed flange 79 of the third pipe 73 of the merging pipe 43 by a pair of bolts (not shown). Thus, the muffler body 81 is detachably connected to the third pipe 73 of the merging pipe 43. A lower surface of the muffler body 81 is fixed to the rear surface 7a of the crankcase 7 via a bracket 88 extending in the up-and-down direction.

With reference to FIGS. 1 and 3, the discharge pipe 82 of the muffler 33 is arranged at a boundary between the front portion 84 and the rear portion 85 of the muffler body 81. The discharge pipe 82 extends in the lateral direction, and penetrates a right side surface of the muffler body 81. A left end (upstream end) of the discharge pipe 82 communicates with the muffling chamber 86 of the muffler body 81, and a right end (downstream end) of the discharge pipe 82 communicates with an external space S on a right side of the muffler body 81. According to the above configuration, the muffling chamber 86 of the muffler body 81 and the external space S on the right side of the muffler body 81 communicate with each other via the discharge pipe 82. In another embodiment, the muffling chamber 86 of the muffler body 81 and an external space on a left side of the muffler body 81 may communicate with each other via the discharge pipe 82.

<Flow of the Exhaust Gas>

With reference to FIGS. 1 and 2, when the engine 1 is driven, the exhaust gas is discharged from the exhaust ports 19 of the first and second cylinder banks 8, 9. The exhaust gas discharged from the exhaust port 19 of the first cylinder bank 8 passes through the upstream portion 51 and the downstream portion 52 of the first exhaust pipe 41 in this order, and then flows into the first pipe 71 of the merging pipe 43. As the exhaust gas passes through the downstream portion 52 of the first exhaust pipe 41 in this way, the exhaust gas is purified by the first catalyst 32a accommodated in the downstream portion 52 of the first exhaust pipe 41. The exhaust gas discharged from the exhaust port 19 of the second cylinder bank 9 passes through the upstream portion 61 and the downstream portion 62 of the second exhaust pipe 42 in this order, and then flows into the second pipe 72 of the merging pipe 43. As the exhaust gas passes through the downstream portion 62 of the second exhaust pipe 42 in this way, the exhaust gas is purified by the second catalyst 32b accommodated in the downstream portion 62 of the second exhaust pipe 42.

The exhaust gas that has flowed into the first and second pipes 71, 72 of the merging pipe 43 passes through the first and second pipes 71, 72 of the merging pipe 43, and then flows into the third pipe 73 of the merging pipe 43. The exhaust gas that has flowed into the third pipe 73 of the merging pipe 43 passes through the third pipe 73 of the merging pipe 43, and then flows into the muffling chamber 86 of the muffler body 81. The exhaust gas that has flowed into the muffling chamber 86 of the muffler body 81 passes through the muffling chamber 86 of the muffler body 81, and then is discharged to the external space S on the right side of the muffler body 81 via the discharge pipe 82. In this way, the exhaust gas passes through the muffling chamber 86 of the muffler body 81, and thus the exhaust noise is reduced.

Effect

Hereinafter, the effects common to the first and second catalysts 32a, 32b will be explained only for the first catalyst 32a, and the explanation for the second catalyst 32b will be omitted. Similarly, the effects common to the first and second exhaust pipes 41, 42 will be explained only for the first exhaust pipe 41, and the explanation for the second exhaust pipe 42 will be omitted.

In the present embodiment, the muffler 33 is detachably connected to the third pipe 73 of the merging pipe 43. By adopting such a configuration, the user can appropriately set the muffler 33 according to the configuration and the like of the work machine P in which the engine 1 is installed. Accordingly, the flexibility for setting the muffler 33 can be improved.

Further, the first catalyst 32a is arranged along the rear surface 8c (the outer surface, and the surface on one side in the front-and-rear direction) of the first cylinder bank 8. By adopting such a configuration, it is possible to prevent the first catalyst 32a from protruding outside the engine body 3. Accordingly, the engine body 3 and the first catalyst 32a are arranged compactly, so that the engine 1 can be made compact.

Especially in the present embodiment, the first catalyst 32a is arranged within the height (the range in the up-and-down direction) of the engine body 3, arranged within the width (the range in the lateral direction) of the engine body 3, and arranged within the thickness (the range in the front-and-rear direction) of the engine body 3. Accordingly, the engine body 3 and the first catalyst 32a are arranged more compactly, so that the engine 1 can be made even more compact.

Further, the first exhaust pipe 41 includes the upstream portion 51 and the downstream portion 52. The upstream portion 51 is connected to the exhaust port 19 of the first cylinder bank 8, and arranged along the right surface 8b of the first cylinder bank 8. The downstream portion 52 is connected to the upstream portion 51, and arranged along the rear surface 8c of the first cylinder bank 8. By adopting such a configuration, the engine body 3 and the first exhaust pipe 41 are arranged compactly, so that the engine 1 can be made even more compact.

Further, the upstream portion 51 of the first exhaust pipe 41 is formed of a pipe having a divided structure. By adopting such a configuration, the flexibility of the shape of the upstream portion 51 of the first exhaust pipe 41 is improved, so that the volume of the upstream portion 51 of the first exhaust pipe 41 can be increased. Accordingly, the expansion of the exhaust gas inside the first exhaust pipe 41 is promoted, so that the temperature of the exhaust gas can be adjusted to the optimum temperature for the first and second catalysts 32a, 32b.

Further, the downstream portion 52 of the first exhaust pipe 41 is formed of a pipe having an undivided structure. By adopting such a configuration, the manufacturing cost of the exhaust collecting pipe 31 can be kept low as compared with a case where the entire first exhaust pipe 41 is formed of a pipe having a divided structure.

Further, the first catalyst 32a is arranged more forward than the rear surface 7a of the crankcase 7. By adopting such a configuration, it is possible to prevent the first catalyst 32a from protruding to a rear side of the engine body 3. Accordingly, the engine body 3 and the first catalyst 32a are arranged more compactly, so that the engine 1 can be made even more compact.

Further, the merging pipe 43 can be detached from the first and second exhaust pipes 41, 42. By adopting such a configuration, an appropriate merging pipe 43 can be selectively used according to the shape and arrangement of the muffler 33. Accordingly, the flexibility for setting the muffler 33 can be further improved.

Further, the drain hole 76 is provided on the bottom surface of the merging portion M of the first and second pipes 71, 72. By adopting such a configuration, it is possible to prevent the drops of water falling from the muffler 33 from collecting in the merging portion M of the first and second pipes 71, 72, so that the merging pipe 43 is less likely to corrode.

Further, the merging pipe 43 is arranged between the first and second cylinder banks 8, 9 when viewed in the front-and-rear direction. By adopting such a configuration, the engine body 3 and the merging pipe 43 are arranged compactly, so that the engine 1 can be made even more compact.

Further, the muffler body 81 extends in the lateral direction from the upper end side (distal end side) of the first cylinder bank 8 to the upper end side (distal end side) of the second cylinder bank 9. By adopting such a configuration, it is possible to sufficiently secure the length of the muffler body 81 without protruding the muffler body 81 greatly with respect to the engine body 3. Accordingly, the volume of the muffler body 81 is increased, so that the muffling performance can be enhanced.

Further, the air cleaner 4 is arranged on the opposite side of the first and second catalysts 32a, 32b with the first and second cylinder banks 8, 9 in between. By adopting such a configuration, the air cleaner 4 is arranged sufficiently away from the first and second catalysts 32a, 32b, and the first and second cylinder banks 8, 9 are arranged between the first and second catalysts 32a, 32b and the air cleaner 4. Accordingly, it is possible to prevent the temperature around the air cleaner 4 from rising due to the heat generation of the first and second catalysts 32a, 32b. Accordingly, the intake air temperature of the engine 1 can be lowered, so that the output of the engine 1 can be improved.

Further, the intake ports 18 open on the inside surfaces of the first and second cylinder banks 8, 9 in the lateral direction. By adopting such a configuration, the distance between the intake ports 18 of the first and second cylinder banks 8, 9 is shortened, so that the length of the intake collecting pipe (not shown) is shortened. Accordingly, the intake collecting pipe can be lightened and the manufacturing cost of the intake collecting pipe can be kept low.

Concrete embodiments of the present invention have been described in the foregoing, but the present invention should not be limited by the foregoing embodiments and various modifications and alterations are possible. That is, the positions, orientations, or the like of the components of the exhaust device 5 can be freely changed according to the configuration of the work machine P (for example, a generator, a welder, a lawn mower, a cultivator, or the like) on which the engine 1 is mounted. Accordingly, the position and exhaust direction of the muffler 33 are also not limited by the foregoing embodiments, and can be freely set within the scope of the present invention. For example, when the work machine P provided with the engine 1 is used in an orchard, the position and exhaust direction of the muffler 33 may be set such that the exhaust gas discharged from the muffler 33 does not hit against the fruit trees.

Glossary of Terms

1: a V-type engine
3: an engine body
4: an air cleaner
7: a crankcase
7a: a rear surface of the crankcase
8: a first cylinder bank
8b: a right surface of the first cylinder bank
8c: a rear surface of the first cylinder bank
9: a second cylinder bank
9b: a left surface of the second cylinder bank
9c: a rear surface of the second cylinder bank
11: a crankshaft
12: a PTO shaft (an example of an output portion)
19: an exhaust port
32a: a first catalyst
32b: a second catalyst
33: a muffler
41: a first exhaust pipe
42: a second exhaust pipe
43: a merging pipe
51: an upstream portion of the first exhaust pipe
52: a downstream portion of the first exhaust pipe
61: an upstream portion of the second exhaust pipe
62: a downstream portion of the second exhaust pipe
71: a first pipe
72: a second pipe
73: a third pipe
76: a drain hole
81: a muffler body
86: a muffling chamber
M: a merging portion
P: a work machine

What is claimed is:

1. A V-type engine, comprising: an engine body including a crankcase configured to rotatably support a crankshaft, and a first and second cylinder banks extending from the crankcase; a first exhaust pipe connected to the first cylinder bank; a second exhaust pipe connected to the second cylinder bank; a merging pipe connected to the first and second exhaust pipes; a first catalyst accommodated in the first exhaust pipe; a second catalyst accommodated in the second exhaust pipe; a muffler detachably connected to the merging pipe, wherein the first catalyst is arranged along an outer surface of the first cylinder bank, and the second catalyst is arranged along an outer surface of the second cylinder bank, wherein provided that an axial direction of the crankshaft is defined as a first direction, the first catalyst is arranged along a surface of the first cylinder bank on one side in the first direction, and the second catalyst is arranged along a surface of the second cylinder bank on the one side in the first direction, wherein provided that a width direction of the engine body is defined as a second direction, an exhaust port is provided on an outside surface of the first and second cylinder banks in the second direction, and the first and second exhaust pipes include: an upstream portion connected to the exhaust port and arranged along the outside surface of the first and second cylinder banks in the second direction; and a downstream portion connected to the upstream portion and arranged along the surface of the first and second cylinder banks on the one side in the first direction, and the first catalyst is accommodated in the downstream portion of the first exhaust pipe, and the second catalyst is accommodated in the downstream portion of the second exhaust pipe.

2. The V-type engine according to claim 1, wherein the upstream portion of the first and second exhaust pipes is formed of a pipe having a divided structure.

3. The V-type engine according to claim 2, wherein the downstream portion of the first and second exhaust pipes is formed of a pipe having an undivided structure.

4. The V-type engine according to claim 1, wherein an output portion of the crankshaft protrudes from a surface of the crankcase on the one side in the first direction, and the first and second catalysts are arranged closer to another side in the first direction than the surface of the crankcase on the one side in the first direction.

5. The V-type engine according to claim 1, wherein the merging pipe integrally includes:
 a first pipe detachably connected to the first exhaust pipe;
 a second pipe detachably connected to the second exhaust pipe; and
 a third pipe connected to a merging portion of the first and second pipes, and
 the muffler is detachably connected to the third pipe.

6. The V-type engine according to claim 5, wherein the muffler is arranged higher than the first and second pipes, and
 a drain hole is provided on a bottom surface of the merging portion of the first and second pipes.

7. The V-type engine according to claim 1, wherein when viewed in an axial direction of the crankshaft, the merging pipe is arranged between the first and second cylinder banks.

8. The V-type engine according to claim 1, wherein the muffler includes a muffler body having a muffling chamber, and
 the muffler body extends in a width direction of the engine body from a distal end side of the first cylinder bank to a distal end side of the second cylinder bank.

9. The V-type engine according to claim 1, further comprising an air cleaner connected to the first and second cylinder banks,
 wherein the air cleaner is arranged on an opposite side of the first and second catalysts with the first and second cylinder banks in between.

10. A work machine comprising the V-type engine according to claim 1.

11. A V-type engine, comprising: an engine body including a crankcase configured to rotatably support a crankshaft, and a first and second cylinder banks extending from the crankcase; a first exhaust pipe connected to the first cylinder bank; a second exhaust pipe connected to the second cylinder bank; a merging pipe connected to the first and second exhaust pipes; a first catalyst accommodated in the first exhaust pipe; a second catalyst accommodated in the second exhaust pipe; and a muffler detachably connected to the merging pipe, wherein the first catalyst is arranged along an outer surface of the first cylinder bank, the second catalyst is arranged along an outer surface of the second cylinder bank, wherein the merging pipe integrally includes: a first pipe detachably connected to the first exhaust pipe; a second pipe detachably connected to the second exhaust pipe; and a third pipe connected to a merging portion of the first and second pipes, and the muffler is detachably connected to the third pipe, wherein the muffler is arranged higher than the first and second pipes, and wherein when viewed in an axial direction of the crankshaft, the merging pipe is arranged between the first and second cylinder banks.

* * * * *